United States Patent
Von Limburg et al.

(10) Patent No.: US 12,179,381 B2
(45) Date of Patent: Dec. 31, 2024

(54) PRINT HEAD FOR PRINTING THREE-DIMENSIONAL STRUCTURES MADE OF CONCRETE AND A METHOD THEREFOR

(71) Applicant: B.T. INNOVATION GMBH, Magdeburg (DE)

(72) Inventors: Felix Von Limburg, Magdeburg (DE); Ingo Heesemann, Magdeburg (DE)

(73) Assignee: B.T. innovation GmbH, Magdeburg (DE)

( * ) Notice: Subject to any disclaimer, the term of this patent is extended or adjusted under 35 U.S.C. 154(b) by 696 days.

(21) Appl. No.: 17/283,435

(22) PCT Filed: Oct. 8, 2019

(86) PCT No.: PCT/EP2019/077234
§ 371 (c)(1),
(2) Date: Apr. 7, 2021

(87) PCT Pub. No.: WO2020/074521
PCT Pub. Date: Apr. 16, 2020

(65) Prior Publication Data
US 2021/0347086 A1 Nov. 11, 2021

(30) Foreign Application Priority Data

Oct. 8, 2018 (DE) ...................... 10 2018 217 141.6

(51) Int. Cl.
*B33Y 30/00* (2015.01)
*B28B 1/00* (2006.01)
(Continued)

(52) U.S. Cl.
CPC ............... *B28B 1/001* (2013.01); *B28B 3/22* (2013.01); *E04B 1/3505* (2013.01); *E04G 21/04* (2013.01); *B33Y 30/00* (2014.12)

(58) Field of Classification Search
None
See application file for complete search history.

(56) References Cited

U.S. PATENT DOCUMENTS

| 5,529,471 A | 6/1996 | Khoshevis |
| 5,656,230 A * | 8/1997 | Khoshevis ............. B33Y 40/00 264/401 |

(Continued)

FOREIGN PATENT DOCUMENTS

| CN | 105216333 A | 1/2016 |
| CN | 205112415 U * | 3/2016 |

(Continued)

OTHER PUBLICATIONS

International Search Report with English Translation issued in corresponding International Application No. PCT/EP2019/077234 date of mailing Mar. 27, 2020 (8 pages).

(Continued)

*Primary Examiner* — Mohammad M Ameen
(74) *Attorney, Agent, or Firm* — FLYNN THIEL, P.C.

(57) ABSTRACT

A print head for printing three-dimensional structures made of concrete and a method used to deposit layers of concrete material one on top of the other. The print head is configured to be moved in space and to deposit individual layers of a concrete material, which forms the structure to be produced, one on top of the other. The print head includes a feeder configured to provide the concrete material, a conveying device configured to receive the concrete material from the feeder and to convey it, a shaping section configured to be filled with the pressurized concrete material and to define lateral dimensions of the layer to be deposited, an exit section pointing in a direction opposite to a feed direction of (Continued)

the print head, and an exiting prevention section configured to prevent the concrete material from exiting in the feed direction of the print head.

1 Claim, 5 Drawing Sheets

(51) Int. Cl.
  *B28B 3/22* (2006.01)
  *E04B 1/35* (2006.01)
  *E04G 21/04* (2006.01)

(56) References Cited

U.S. PATENT DOCUMENTS

| | | |
|---|---|---|
| 10,695,981 B2 | 6/2020 | Höchsmann et al. |
| 2007/0138678 A1 | 6/2007 | Khoshnevis |
| 2009/0134539 A1 | 5/2009 | Khoshnevis |
| 2010/0257792 A1 | 10/2010 | Khoshnevis |
| 2011/0079935 A1 | 4/2011 | Techlin et al. |
| 2014/0252668 A1 | 9/2014 | Austin et al. |
| 2017/0016244 A1* | 1/2017 | Keller ................ E04G 21/0463 |
| 2017/0365365 A1 | 12/2017 | White et al. |
| 2018/0071949 A1 | 3/2018 | Giles |
| 2018/0093373 A1 | 4/2018 | Niederberger |

FOREIGN PATENT DOCUMENTS

| | | | |
|---|---|---|---|
| CN | 106903776 A | | 6/2017 |
| CN | 108237613 A | | 7/2018 |
| DE | 965 687 C | * | 6/1957 |
| DE | 965687 | | 6/1957 |
| EP | 3117982 A1 | | 1/2017 |
| FR | 933 162 A | * | 4/1948 |
| FR | 933162 | | 4/1948 |
| RU | 2245784 C2 | | 2/2005 |
| RU | 2631793 C1 | | 9/2017 |
| RU | 2016142836 A | | 5/2018 |
| SU | 459554 | | 2/1975 |
| WO | 9748557 A2 | | 12/1997 |
| WO | 2016166116 A1 | | 10/2016 |

OTHER PUBLICATIONS

Written Opinion of International Searching Authority issued in corresponding International Application No. PCT/EP2019/077234 dated Mar. 27, 2020 (10 pages).
German Search Report issued in corresponding German Application No. 10 2018 217 141.6, dated Jul. 22, 2019 (10 pages).
Russian Office Action received in corresponding Russian Patent Application No. 2021110913, dated Nov. 30, 2021 (8 pages).
Russian Office Action with English translation issued in corresponding Russian Application No. 2021110913 dated Apr. 28, 2022 (11 pages).
Chinese Office Action, with English translation, issued in corresponding China Application No. 201980071755.1, dated Jan. 21, 2022 (17 pages).
European Office Action issued in corresponding European Application No. 19 786 541.3, dated Oct. 4, 2023 (25 pages).

* cited by examiner

PRINT HEAD FOR PRINTING THREE-DIMENSIONAL STRUCTURES MADE OF CONCRETE AND A METHOD THEREFOR

The present invention relates to a print head for printing three-dimensional structures made of concrete and a method therefor.

Concrete is a raw material readily available around the world that can be shaped almost freely with suitable manufacturing technologies. Prefabricated concrete elements or semi-finished parts can be manufactured industrially or the concrete can be processed directly at the construction site. The work involved in setting up the formwork is substantial and therefore costly in particular in the last application, the in-situ concrete construction. 3D printing makes it possible to shape concrete at the construction site without formwork. The technology in the field of 3D printing is not yet technically mature and is currently associated with many problems. The aim is to print complex geometries, such as entire houses, at a construction site, regardless of location. This technology is known from document US 2007/0138678 A1 which discloses the application of cementitious material in layers, as is customary in 3D printing. The cementitious material is extruded and, in the process, exits the outlet of a nozzle downwardly in an uncured state. In order to smooth the outer sides of the material, plates are arranged below the nozzle outlet, and act as a trowel and prevent the material from exiting laterally, transversely to the feed direction of the nozzle. When exiting the nozzle, the material expands and spreads out within the lateral plates both in the feed direction and in the direction opposite to the feed direction of the nozzle. The spread in the direction opposite to the feed direction is made possible by the advancement of the nozzle which then creates space for the material exiting from the nozzle in a direction opposite to the feed direction. However, the spread in the feed direction can have a negative impact on the surface quality of the layer to be deposited due to the accumulation of material and the swelling of the material. This is particularly disadvantageous in places where high precision is required, such as lintels for windows and doors. Accumulation of the material can occur, for example, due to fluctuations in the feed velocity of the nozzle. Furthermore, the conventionally applied concrete is to a certain extent flowable and runs downwardly according to the force of gravity and then forms bulbous structures in the individual layers. The joints between the individual layers often exhibit an only poor bonding with each other, which is why these walls usually have poorer characteristic values than conventional prefabricated concrete elements cast in one piece. For this reason, complex and expensive post-processing is necessary for structures according to prior art.

Furthermore, the subsequent layer in prior art is only printed when the underlying layer has sufficient strength, which makes the technology slow and leads to the printed concrete elements having a poor surface quality.

In addition to solid walls, it is also known from prior art to form hollow bodies, for example, by printing two strands of the extruded material in parallel. Such hollow bodies can thereafter be filled with a reinforcement cage and concrete. The concrete walls there do not have any shear connector or the like incorporated. For this reason, the walls can only withstand little internal pressure during the filling process. As a consequence, it is only possible to work at low concrete casting speeds when filling the cavity with in-situ concrete.

It is therefore an object of the present invention to fabricate stable structures made of concrete in a short time.

This object is satisfied by a print head according to claim 1.

According to a first aspect of the present invention, a print head for printing three-dimensional structures made of concrete is provided, where the print head is configured to be moved in space and to deposit individual layers of a concrete material one on top of the other which forms the structure to be produced. The print head there comprises the following: a feeder which is configured to provide the concrete material, a conveying device which is configured to receive the concrete material from the feeder and to convey it, a shaping section which is configured to be filled with the pressurized concrete material and to define at least the lateral dimensions of the layer to be deposited, an exit section pointing in a direction opposite to a feed direction of the print head, the print head further comprising: an Exiting prevention section which is configured to prevent the concrete material from exiting in the direction of the feed direction of the print head.

The print head comprises the feeder that allows the print head, which is movable in space, to be supplied with concrete material. The material can be fed into the feeder, for example, by way of a concrete pump, while the print head moves in space. The print head including the material has a small mass, which allows the print head to be moved precisely in space and facilitates the support of the print head. On the other hand, the print head can also be filled with material prior to the movement process. The conveying device can be, for example, an auger or a pump which can also increase the pressure of the concrete material in addition to conveying the material into the shaping section. Due to the material filling the shaping section under pressure, the material can fill the shaping section over the entire width of the shaping section transverse to the feed direction of the print head or transverse to the longitudinal extension of the layer to be deposited, and there begin to set under pressure. At least the lateral dimensions of the layer to be deposited can thereby be defined by the shaping section. The material, which is defined in cross section at least with regard to the lateral dimensions, exits into the open from an exit section that points in a direction opposite to the feed direction without changing the lateral dimensions because the material exhibits good dimensional stability, in particular in the case of a material having a low ratio of water to cement. The additional Exiting prevention section can prevent the concrete material from exiting from the print head in the feed direction. This means that the layer can be deposited along a defined direction and an accumulation of concrete material in front of the print head can be prevented. A stable layer with a good surface quality can thus be deposited.

The print head preferably comprises a pressure compensation section which is preferably disposed within the shaping section Fluctuations in the feed rate or the material consistency can cause pressure fluctuations in the print head. These pressure fluctuations can be compensated for by the pressure compensation section such that leakage flows or backflows caused by pressure fluctuations can be prevented and the concrete material exits from the exit section with a good surface quality. The pressure compensation section is preferably provided in the shaping section, since the material can still be shaped there.

According to a further aspect of the invention, the print head can furthermore comprise an energy supply device which is configured to supply energy to the concrete material within the shaping section.

The material setting can be accelerated by the energy supply device, so that the material exits from the exit section in a substantially dimensionally stable manner. For example, the shaping section can introduce additional energy into the concrete by way of vibrating units, which improves the dimensional stability of the material after it has been let out. This further increases the stability and surface quality of the structure.

The shaping section preferably comprises a controllable profiling device which is configured to be able to vary the layer thickness of the layer to be deposited.

The controllable profiling device creates the possibility of depositing layers of different thicknesses with one and the same print head. The thickness of the layer, i.e., the height of the layer, can be configured differently from layer to layer and also within a layer in the longitudinal direction of the layer or also in the width direction of the layer.

According to a further aspect of the invention, the profiling device can be configured in such a way that at least one section along the width direction of the layer of concrete material is formed to be concave in terms of the layer thickness.

If at least one section along the width direction of the layer is formed to be concave, then the material of the layer thereabove can easily flow into this concave section. This results in a positive fit between adjacent layers, which ensures good stability of the printed structure.

According to yet a further aspect, the profiling device can be configured to form at least in sections at least two strands spaced apart and running parallel to one another.

The profiling device can there in part close the cross section entirely in the width direction. In this way, for example, the concrete outflow can be prevented at the center of the cross-section in the width direction and a kind of double wall can be created in one printing process, whereby two parallel strands are formed spaced apart.

The profiling device preferably forms the pressure compensation device.

If the profiling device is capable of compensating for pressure fluctuations, then these pressure fluctuations can be compensated for by local changes in the layer thickness. These changes in layer thickness can be compensated for with the layers disposed thereabove. Furthermore, the complexity of the print head can be reduced by this aspect.

According to a further aspect, the profiling device can comprise at least one elastic element and at least one flap, where the flap is attached to the print head by way of the elastic element.

With the aid of the flap, the layer thickness can be changed by varying the flap position. The elastic element enables the flap to adjust its position accordingly in the event of pressure fluctuations.

According to a further aspect of the invention, the print head can furthermore comprise a binding material processing device which is configured to deposit at least one layer of a binding material between adjacent layers of concrete material.

The binding material creates better bonding between the individual layers of concrete material. Since the printing head comprises a binding material processing device, a layer of binding material can be deposited by one and the same printing head before a layer of concrete material is deposited. The stability of the structure is substantially ensured by the layers of concrete material, where the layers of binding material ensure good bonding of the layers of concrete material.

The binding material processing device preferably comprises an exit section which opens substantially downwardly.

This allows the binding material to be applied to the layer of concrete disposed therebeneath by the action of gravity, which enables simple processing. If the binding material processing device is furthermore provided in the feed direction at a leading end of the print head, then the binding material layer can be smoothed and distributed evenly by the print head subsequently running over the binding material layer, so that the binding material can be applied largely covering the entire surface between printed concrete layers.

According to yet another aspect, the print head can additionally comprise a magazine for storing reinforcement elements or connection elements, and a reinforcement insert device which is configured to insert reinforcement elements or connection elements horizontally or vertically into the layers of concrete material.

Reinforcement elements or connection elements can then be inserted in an automated manner by the print head. They can be inserted into the not yet set concrete material still within the print head or also into a section already deposited that has been formed to be concave by the profiling device, where the material of the layer disposed thereabove would then fill the concave section and set the reinforcement element in concrete. The reinforcement device can insert, for example, reinforcement elements in the longitudinal extension of a layer in that reinforcement elements are continuously fed into the concrete not yet set within the shaping section. However, it is also conceivable that reinforcement elements are inserted into the layers transverse to the feed direction of the print head.

Reinforcement elements do not have to be arranged vertically in the concrete in order to connect layers disposed one on top of the another, but can also be integrated substantially horizontally into the two wall portions when printing a double wall. This gives the printed concrete elements a bond with one another, whereby these bonded double walls can be filled at a higher concreting speed than printed double-wall structures without shear connectors.

According to a further aspect, the print head can furthermore comprise a trowel smoothing device which is configured to rub off the transitions of the already deposited layers and thereby smooth them, where the trowel smoothing device is preferably configured to guide the print head.

According to this aspect, the surface quality of the structure to be printed can be further improved. Furthermore, the print head can be guided by the trowel smoothing device. A motion of the print head in a direction transverse to the feed direction is there prevented by the trowel smoothing device striking against the layers that have already been deposited.

According to a further aspect of the invention, a method is provided in which a print head of the aforementioned kind deposits layers of concrete material one on top of the other, where concrete with a dry mixing ratio is used as concrete material.

The concrete preferably has a water/cement ratio between 0.23 and 0.35.

Concretes with this mixing ratio achieve sufficient dimensional stability in a short time, whereby a layer with good surface quality and dimensional accuracy can be obtained downstream of the exit section of the extruder.

According to a further aspect of the invention, variations in the layer thickness of the layer disposed therebeneath can be detected during the feed motion of the extruder and the layer thickness of the layer to be deposited can be adjusted.

In this way, a substantially flat upper side of the structure can be obtained without complex post-processing.

Further details and preferred embodiments shall be illustrated with the following figures, where.

Figure 1:
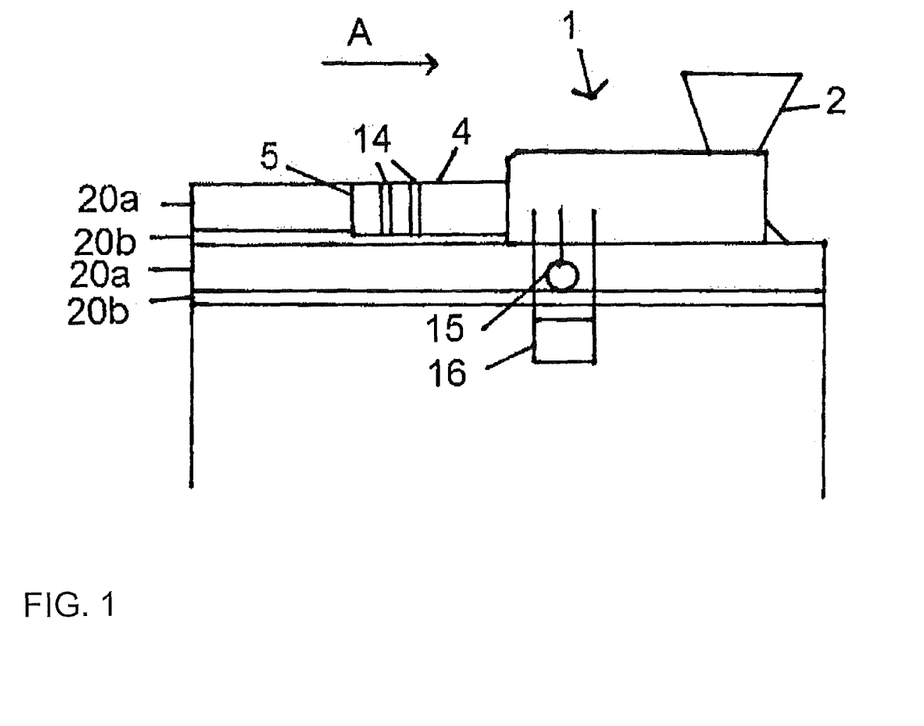
FIG. 1 shows the print head according to the invention

FIG. 1 schematically shows a print head 1 according to the invention in use with which several layers of concrete material 20a and several layers of a binding material 20b have already been deposited in order to print a three-dimensional structure made of concrete. The print head moves at a certain feed rate along a direction of arrow A which defines the longitudinal extension of the individual layers. The width direction of the layer runs transverse to the longitudinal direction of the layers or transverse to the feed direction into the plane of the drawing. The layer thickness direction is defined by the stacking direction of the individual layers. The drive for providing the advance of print head 1 is not shown for reasons of clarity. In stationary systems, for example, the print head can be driven via a frame within which the structure to be printed is to be created. Print head 1 would slide or roll along guide rails and also be movable in height in order to be able to print individual layers 20a, 20b. For mobile applications, such as construction sites, the print head can also be moved by way of an arm that can be moved in space. In the situation shown in FIG. 1, print head 1 deposits a further layer 20a of concrete material.

Figure 2A:
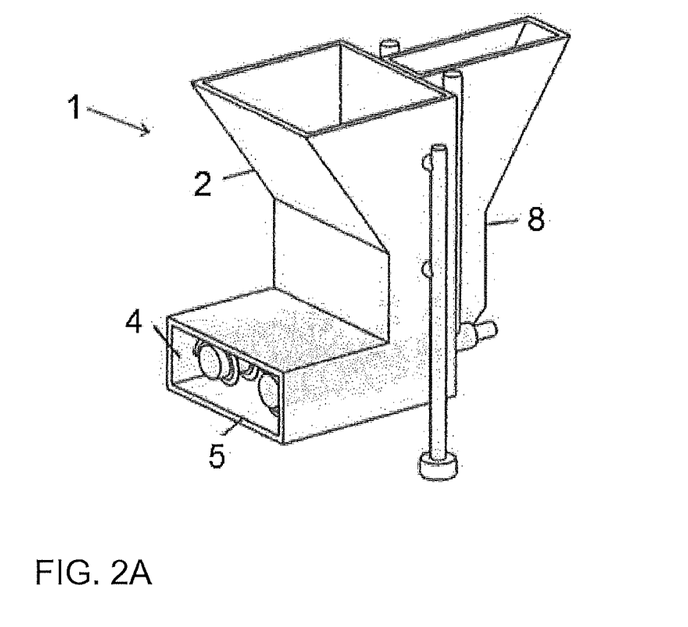
FIG. 2A shows an oblique view of the print head from FIG. 1
Figure 2B:
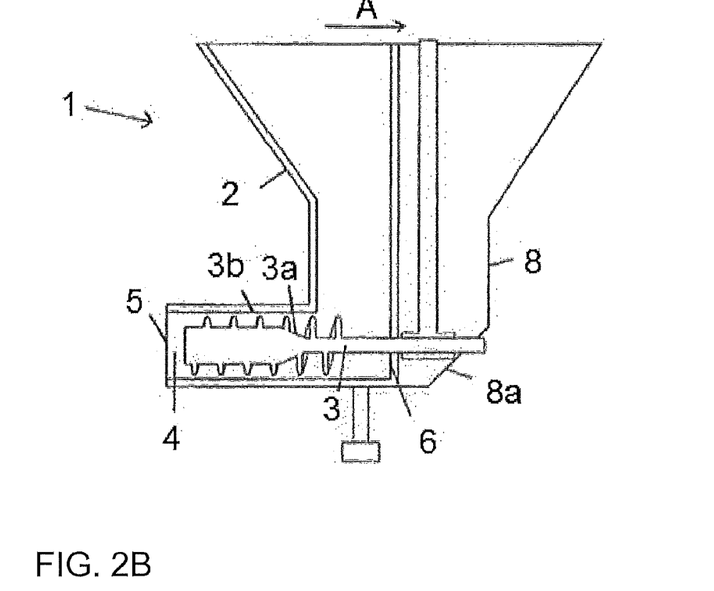
FIG. 2B shows an oblique view of the print head from FIG. 2A

In the three-dimensional view in FIG. 2A of print head 1 and in the sectional view in FIG. 2B, print head 1 according to the invention is again shown in simplified form. Print head 1 comprises a feeder 2. The purpose of feeder 2 is to supply print head 1 movable in space with concrete material.

The material can be fed into feeder 2, for example, by way of a concrete pump, while print head moves in space. Print head 1 including the material has a small mass, which allows print head 1 to be moved precisely in space and facilitates the support of print head 1. On the other hand, print head 1 can also be filled with material prior to the movement process. A concrete with a dry mix ratio having a water/cement ratio between 0.23 and 0.35 is preferably used as concrete material. The water/cement ratio (w/c) indicates a mass ratio between the mass of water present in 1 $m^3$ of concrete compared to cement.

Furthermore, print head 1 comprises conveying device 3 which is presently configured as an auger device. As shown in FIG. 2A, conveying device 3 is preferably configured in the form of two augers. The alternating engagement of the auger threads with the material results in good mixing and a homogeneous material. Conveying device 3, however, can also be formed by only one auger or by a pump. Conveying device 3 is supplied with material from feeder 2 and conveys it into a shaping section 4 in a direction opposite to the feed direction based on the principle of forced conveyance. The auger preferably has an enlarging section 3a in which the auger diameter increases and the gap width between auger 3 and housing wall 3b decreases. The concrete material is there compressed and the shear rate increases due to the smaller gap width, which causes a pressure build-up in the material. The concrete material is therefore conveyed subject to pressure into shaping section 4. Due to the fact that the material fills shaping section 4 subject to pressure, the material can completely fill the cross section of shaping section 4, in particular over the entire width of shaping section 4. The pressure in the material causes the concrete to be dimensionally stable and to begin to set. At least the lateral dimensions of the layer to be deposited can thereby be defined by shaping section 4. The material, which is defined in cross section at least with regard to the lateral dimensions, exits into the open from an exit section 5 that points in a direction opposite to feed direction A without changing the lateral dimensions since the material has good dimensional stability due to the low w/c ratio. Exiting prevention section 6 is additionally provided and prevents the concrete material, which can also flow in the feed direction due to the pressure built up, from exiting from print head 1 in feed direction A. A space is created that is closed in the feed direction on five sides by housing wall 3b above, below and laterally on both sides as well as exiting prevention section, and the layer can be deposited along a defined direction opposite to feed direction A and a build-up of concrete material in front of the print head can be prevented. A stable layer with a good surface quality can thus be deposited. Furthermore, as shown in FIGS. 2A and 2B, print head 1 preferably comprises a binding material processing device 8. At least one layer 20b of binding material can be applied with binding material processing device 8 between adjacent layers 20a of the concrete material, as shown in FIG. 1. The binding material is preferably concrete having a higher water/cement ratio, jointing mortar, or even industrial adhesive. The dry concrete material which promotes rapid setting can under certain circumstances cause poor bonding with next layer 20a. Layer 20b of binding material bonds individual layers 20a of concrete material to one another and thereby eliminates the joint as a weak point. As shown in FIG. 2B, binding material processing device 8 preferably comprises an exit section 8a which opens substantially downwardly. This allows the binding material to be applied to the layer of concrete disposed therebeneath by the action of gravity, which enables simple processing. Exit section 8a is preferably arranged in feed direction A upstream of exit section 5 for the concrete material. The binding material is then already applied to layer 20a of the concrete material disposed therebeneath and can be distributed over a large area by the weight of layer 20a made of concrete material to be deposited. Excess binding material would there be squeezed out to the side.

As shown in FIG. 1, the print head can furthermore comprise an energy supply device 14. In FIG. 1, this energy supply device 14 is configured in the form of heating strips along shaping section 4. Alternatively, vibrating plates can also be provided which vibrate the concrete either in shaping section 4 or already downstream of exit section 5 at the edges at a certain frequency, for example, 120 Hz. The concrete material can also be irradiated with microwaves. With all of these methods, the concrete material is supplied with energy which accelerates the setting of the material, so that the material exits from the exit section in a substantially dimensionally stable manner or continues to set quickly thereafter. This further increases the stability and surface quality of the structure.

FIG. 1 further shows disk-shaped trowels 15, which form the trowel smoothing device according to the present invention and are attached to the print head on both sides of print head 1. This trowel smoothing device 15 can smoothly process the layers that have already been deposited by rubbing off material, where the surface quality and the dimensional accuracy of the lateral dimensions of the structure is improved. In particular, excess binding material can thus be removed and collected, for example, in a collection container 16. Furthermore, trowel smoothing device 15 can guide the print head, since the former is suitable to prevent a motion transverse to the feed direction in a horizontal direction by preventing the disk-shaped trowels from moving in this direction by the layers that have already been deposited.

Figure 3:
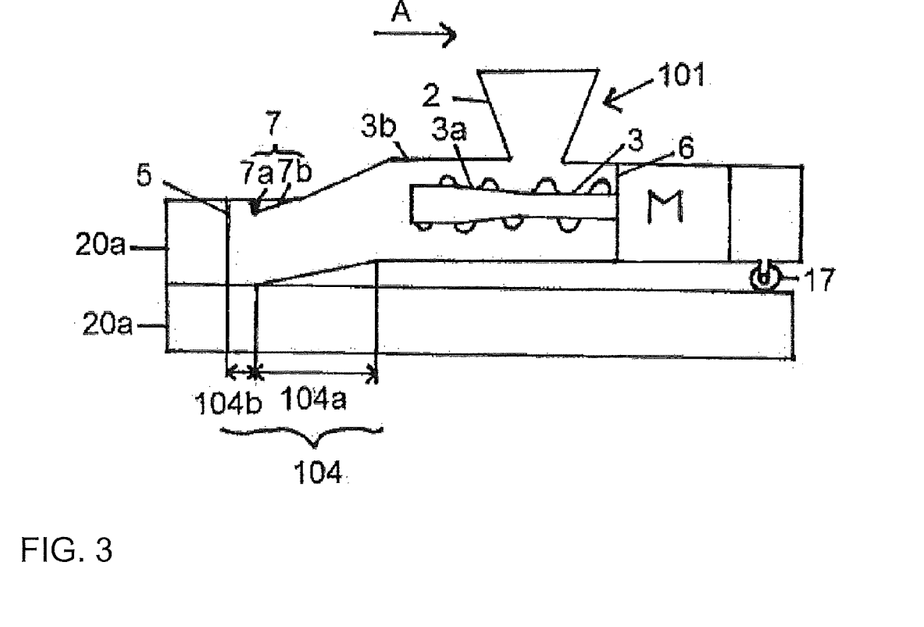
FIG. 3 shows a further embodiment of the print head according to the invention in a sectional view

A further embodiment is shown in FIG. 3. Print head 1 is similar to print head 1 of the first embodiment. Print head 101, however, comprises a modified shaping section 104. It consists of a tapering section 104a running towards layer 20a disposed therebeneath and a straight section 104b running in a direction opposite to feed direction A. Since tapering section 104a is provided, the pressure upstream of shaping section 104 can be increased further by damming up the material. This pressure is then relieved in tapered section 104a while the concrete material flows through the incline of tapered section 104a to the layer disposed therebeneath. The height offset between the axis of augers 3 can then be eliminated gently, and there is no sudden drop in the concrete material at exit section 5. The material sets subject to the remaining pressure in section 104b. Section 104b is no longer defined only by housing wall 3b, but by lower layer 20a made of concrete material. The concrete material should still be flowable at the transition between inclined tapered section 104a and the straight section in order to prevent it from getting stuck.

Furthermore, print head 101 comprises a profiling device 7 which is located within shaping section 104. Profiling device 7 is formed by an elastic element 7a and a flap 7b. Profiling device 7 creates the possibility of depositing layers of different thicknesses with one and the same print head. Flap 7b can be rotated to various positions, for example, by use of a motor. Accordingly, it can protrude into the cross section of shaping section 104 at different depths and thereby configure the layer thickness, i.e., the height of the layer, differently from layer to layer. Flap 7b, however, can also be adjusted while a layer is being deposited and the layer thickness can then also be varied within a layer in the longitudinal direction of the layer. Furthermore, flap 7b does not have to be formed over the entire width of the shaping section, but can also be provided only in a section in the width direction of shaping section 104, which is why the layer thickness varies in the width direction of the layer. Flap 7b then creates at least one section that is concave with respect to the layer thickness along the width direction of layer 20a of concrete material. This allows material from the layer disposed thereabove to simply flow into this concave section. This results in a positive fit between adjacent layers, which ensures good stability of the printed structure. This is shown by way of example in FIG. 4, which shows a cross section through the printed structure. A concave section 30 can be formed into which material of layer 20a disposed thereabove flows and sets there. Furthermore, profiling device 7 is configured as the pressure compensation device in print head 101. By connecting flap 7b to print head 101 by way of elastic element 7a, flap 7b can be adjusted subject to pressure fluctuations. The pressure fluctuation is compensated for in this manner and the layer thickness is varied locally if necessary. These changes in layer thickness can be compensated for with the layers disposed thereabove.

Figure 4:
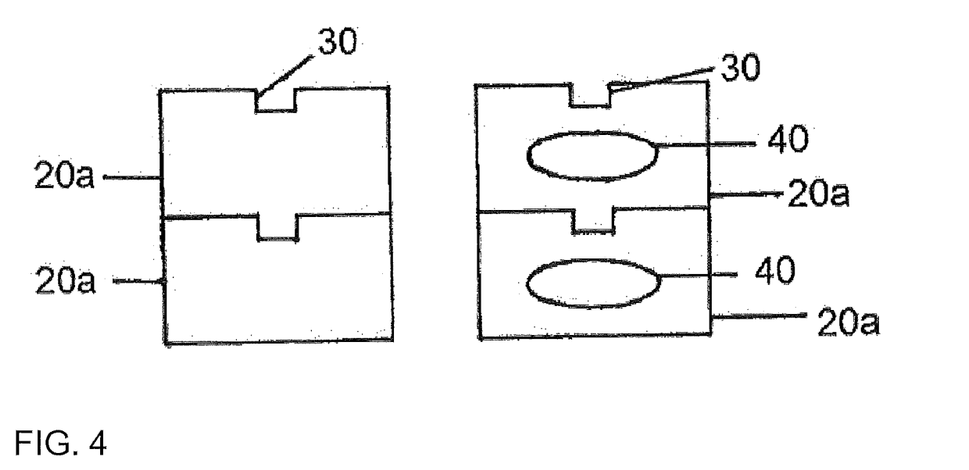
FIG. 4 shows a cross-sectional view through the processed concrete material

In FIG. 4, a concave section 30 is also provided on the right-hand side. However, layers 20a are provided with a cavity 40. This cavity 40 can be introduced into the layer, for example, by way of a mandrel which is fastened by webs to housing wall 3b of the shaping section. This makes the structure particularly light because material is saved.

Figure 5:
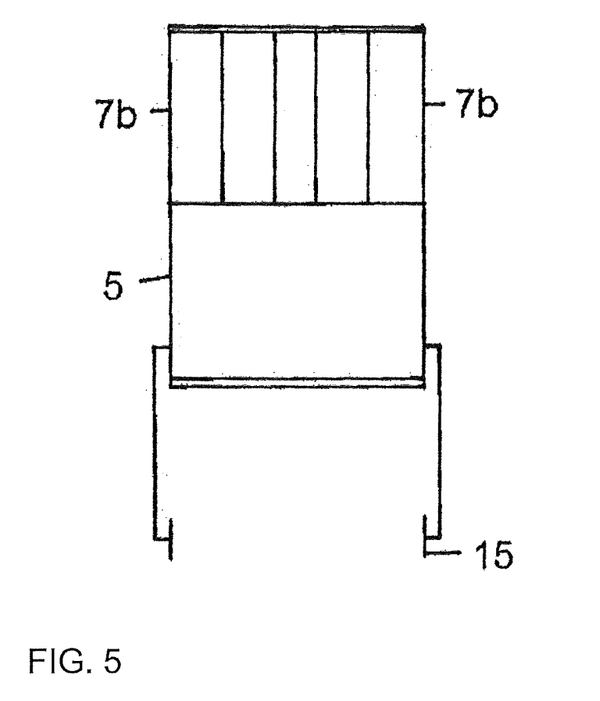
FIG. 5 shows the print head according to the invention with a viewing direction onto the exit section

FIG. 5 finally schematically shows a print head with a viewing direction onto exit section 5 of the print head. As shown in FIG. 5, the print head comprises several flaps 7b across the width direction of the shaping section which protrude from the upper side into the shaping section. These flaps 7b are adjustable and can be actuated individually, and different contours with alternating concave and convex sections can then be created on the upper side of the layer. Bonding of the individual layers can then be further improved. It is also possible to make individual flaps 7b assume the completely closed position. The closed position of a flap 7b is the one in which flap 7b rests on the lower layer. The cross section in the shaping section can thereby be closed in part in the width direction. If the outer ones of the plurality of flaps 7b are made to assume a closed position in the width direction, then the width of the layer to be deposited can be varied. If, on the other hand, an internal flap 7b is made to assume a closed position, then the layer to be deposited can be divided at least in sections into at least two strands extending in parallel which exit from exit section 5 in a dimensionally stable manner. At least two strands spaced apart transverse to the feed direction of the print head exit from the exit section 5. For example, a double wall can thus be produced.

Figure 6:
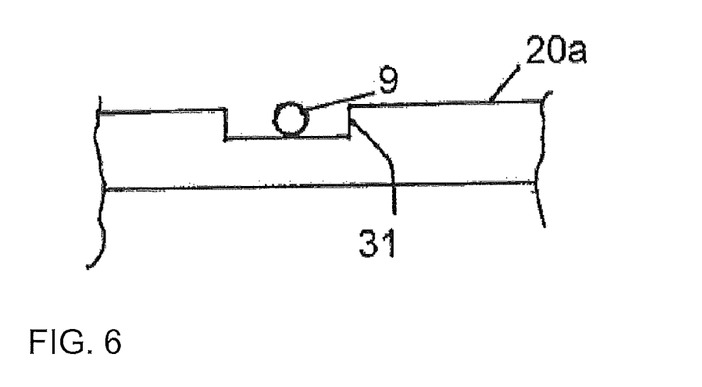
FIG. 6 shows a cross-sectional view through the processed concrete material

FIG. 6 shows a detail of a layer 20a made of concrete material, where a concave section 31 was provided in the longitudinal direction of the layer. This section can be obtained, for example, by collectively lowering the flaps of the print head in FIG. 5 to a position closed in part. A reinforcement element 9 can be inserted into such a concave section 31 and is concreted in with the subsequent layer. Reinforcement element 9 can also protrude laterally from layer 20a and protrude into an oppositely disposed concave section 31 of same layer 20a. The stability between individual layer sections can thus be improved.

Figure 7:
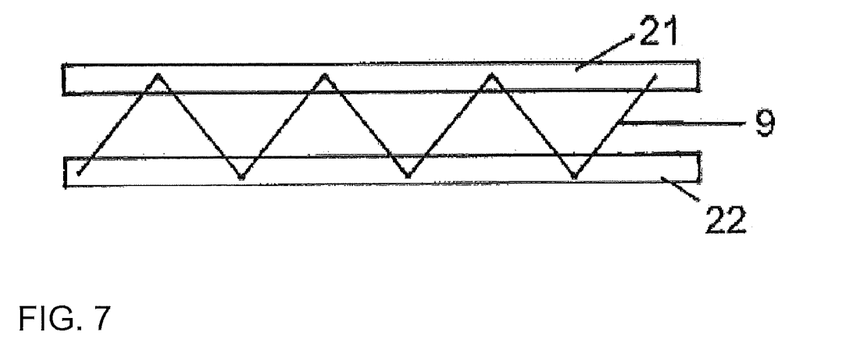
FIG. 7 shows a double wall produced with the aid of the print head according to the invention in a top view.

This is particularly advantageous when producing a double wall, where it is possible for concave sections 31 to be provided in the parallel strands at the same position or also at alternating positions in the feed direction of the print head. A double wall is shown in FIG. 7 by way of example in a top view. The double wall is formed in that each deposited layer is formed by two strands 21 and 22 extending in parallel and spaced apart. Furthermore, the strands extending in parallel can be stabilized by way of reinforcement elements or connection elements 9 in a horizontal direction transverse to the feed direction. These reinforcement elements can be removed by a reinforcement insertion device from a magazine, which the print head comprises, and inserted into the layers of concrete material. FIG. 7 shows a lattice-like connection element 9 which connects two strands 21 and 22 to one another in a horizontal direction. In this case, for example, concave sections can be provided at alternating positions with respect to strands 21 and 22 in the feed direction of the print head and facilitate the insertion of the connection element. When the space between the wall parts formed by strands 21 and 22 is subsequently filled with in-situ concrete, higher concreting speeds can be employed.

The invention claimed is:
1. A print head for printing three-dimensional structures made of concrete, where said print head is configured to be moved in space and to deposit individual layers of a concrete material one on top of the other which forms the structure to be produced, said print head comprising:
- a feeder which is configured to provide said concrete material;
- a conveying device which is configured to receive said concrete material from said feeder and convey said concrete material;
- a shaping section which is configured to be filled by the concrete material that is pressurized and to define at least lateral dimensions of one of said layers to be deposited;
- an exit section pointing in a direction opposite to a feed direction of said print head; and
- an exiting prevention section which is configured to prevent said concrete material from exiting in the direction of said feed direction of said print head;
- wherein said conveying device is an auger device;
- wherein said shaping section comprises a controllable profiling device which is configured to be able to vary a layer thickness of the one of said layers to be deposited; and
- wherein said controllable profiling device is configured to form at least one section along a width direction of the one of said layers made of concrete material to be concave with regard to the layer thickness.

* * * * *